United States Patent
Delvecchio et al.

(10) Patent No.: US 7,204,694 B2
(45) Date of Patent: Apr. 17, 2007

(54) ROSARY HAVING AUDIBLE AND/OR VISUAL INDICATORS AND RELATED METHODS

(75) Inventors: Raffaella Delvecchio, Vero Beach, FL (US); Gary Lee Graham, Vero Beach, FL (US)

(73) Assignee: R & G Rosary, LLC, Vero Beach, FL (US)

( * ) Notice: Subject to any disclaimer, the term of this patent is extended or adjusted under 35 U.S.C. 154(b) by 588 days.

(21) Appl. No.: 10/628,623

(22) Filed: Jul. 28, 2003

(65) Prior Publication Data

US 2005/0026120 A1   Feb. 3, 2005

(51) Int. Cl.
*A44C 23/00* (2006.01)
(52) U.S. Cl. ..................................... 434/246
(58) Field of Classification Search ......... 434/245–246
See application file for complete search history.

(56) References Cited

U.S. PATENT DOCUMENTS

| | | |
|---|---|---|
| 2,759,096 A | 8/1956 | Caissie |
| 2,853,802 A * | 9/1958 | Castellano .................. 434/246 |
| 3,806,911 A | 4/1974 | Pripusich ..................... 340/325 |
| 4,365,246 A | 12/1982 | Dewolf et al. .............. 340/802 |
| 4,601,584 A | 7/1986 | DeWolf et al. ............... 368/10 |
| 5,477,433 A | 12/1995 | Ohlund ........................ 326/104 |
| 5,505,622 A | 4/1996 | Bosmani ..................... 434/246 |
| 6,540,519 B2 | 4/2003 | Wexler ........................ 434/246 |
| 6,589,056 B2 | 7/2003 | Mc Govern ................ 434/246 |
| 2002/0089859 A1 | 7/2002 | Jackson et al. ............. 362/571 |
| 2003/0086521 A1 | 5/2003 | Rana ............................. 377/3 |
| 2003/0177858 A1 | 9/2003 | Lugo ........................... 74/558 |
| 2004/0076937 A1 * | 4/2004 | Howard ...................... 434/245 |

FOREIGN PATENT DOCUMENTS

WO    WO 01/48720 A1 *  7/2001

* cited by examiner

*Primary Examiner*—Kathleen Mosser
(74) *Attorney, Agent, or Firm*—Allen, Dyer, Doppelt, Milbrath & Gilchrist, P.A.

(57) ABSTRACT

A rosary includes a flexible elongate member and a plurality of beads carried thereby. The rosary may also include a sensor, and an audible indicator carried by the flexible elongate member for providing an audible indication based upon the sensor. The rosary may further include a visual indicator, in addition to or in place of, the audible indicator. The visual indicator may also be carried by the flexible elongate member for providing a visual indication based upon the sensor.

39 Claims, 6 Drawing Sheets

ROSARY HAVING AUDIBLE AND/OR VISUAL INDICATORS AND RELATED METHODS

FIELD OF THE INVENTION

The present invention relates generally to religious articles and, more specifically, to a rosary including an indicator, and associated methods.

BACKGROUND OF THE INVENTION

A rosary may generally comprise a flexible elongate member, such as a string, carrying a plurality of beads. The flexible elongate member may be arranged in a loop, and the plurality of beads may be used to keep track of the number or repetitious prayers recited by the user. The prayers to be recited by the user may change daily and throughout different times of the year, e.g., Advent or Easter, and may vary from bead to bead.

Accordingly, a prayer associated with a rosary may be difficult to learn and/or recite. Some devices have been introduced to assist a user in learning and reciting prayers associated with a rosary. U.S. Pat. No. 6,540,519 to Wexler, for example, discloses a handheld apparatus for prompting and teaching a prayer associated with a rosary to a user. The handheld device includes a plurality of LEDs carried by a housing, and generates a user operable voice message corresponding to a portion of the prayer.

U.S. Pat. No. 4,365,246 to De Wolf et al. discloses a handheld rosary device that visually indicates prayer steps. More specifically, the handheld rosary includes a plurality of light emitting diodes (LEDs) configured in a matrix and carried by a housing. The LEDs may be configured to have characteristics indicative of various prayers. U.S. Pat. No. 4,601,584 to DeWolf et al. discloses a similar rosary device that is carried by a wristwatch.

Once a user learns the prayer of the rosary, it may be difficult to keep track of the number of prayers that have been recited. U.S. Published Application No. 2003/0086521 to Rana discloses an electronic rosary including a plurality of beads and an alphanumeric display for counting various prayer recitations. More specifically, the alphanumeric display is responsive to a bead sensor that senses the passing of a bead past a predetermined location to advance the displayed number.

SUMMARY OF THE INVENTION

In view of the foregoing background, it is therefore an object of the present invention to provide a rosary for readily assisting a user in reciting and learning prayers associated with a rosary.

This and other objects, features, and advantages of the present invention are provided by a rosary comprising a sensor and an indicator responsive to the sensor for providing an indication to assist a user in reciting and learning prayers associated with the rosary. More specifically, the rosary includes a flexible elongate member and a plurality of beads carried thereby, at least one sensor, and an audible indicator carried by the flexible elongate member for providing an audible indication based upon the at least one sensor. The sensor and audible indicator advantageously assist a user in learning and reciting a prayer associated with the rosary and learning and reciting various prayers corresponding to the plurality of beads.

The flexible elongate member may be arranged in a loop and with a leg extending outwardly therefrom. The audible indicator may be carried at a junction between the loop and leg. The sensor may be carried by the audible indicator in some embodiments.

The plurality of beads may comprise sets of beads separated by respective transition beads carried by the flexible elongate member. Accordingly, sensors may also be carried by the transition beads.

The sensor may sense user contact, or a voice of a user, for example. Accordingly, the user may advantageously selectively activate the rosary by contact or voice, depending upon the setting. For example, the user may want to activate the rosary by contact, rather than by voice, in a quite environment.

The audible indicator may comprise a recorder for recording the audible indication, which may, for example, be a prayer. This advantageously allows the user to customize, or personalize, the rosary. The audible indicator may further comprise a timer for providing a different audible indication based upon a calendar date so that the user may advantageously learn different prayers corresponding to different days and calendar dates, e.g., Advent, Easter, etc.

The rosary may also comprise a visual indicator for providing a visual indication based upon the sensor. The visual indicator may also comprise a timer for providing a different visual indication based upon a particular day or a particular calendar date. The visual indication may comprise a religious image representing a corresponding prayer, for example, or prayer text to advantageously assist the user in learning prayers associated with the rosary.

The rosary may further comprise a switch for permitting user selection of at least one of the audible and visual indication to advantageously allow a user to customize use of the rosary in different environments, e.g., a quite environment.

A method aspect of the present invention is for providing an audible indication relating to a rosary. The method may comprise generating the audible indication from the audible indicator based upon the at least one sensor, as described above. Another method aspect of the present invention is for providing a visual indication relating to a rosary. The method may comprise generating the visual indication from the visual indicator based upon the at least one sensor, as described above.

DETAILED DESCRIPTION OF THE PREFERRED EMBODIMENTS

The present invention will now be described more fully hereinafter with reference to the accompanying drawings, in which preferred embodiments of the invention are shown.

This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notations are used to indicate similar elements in alternate embodiments.

Figure 1:
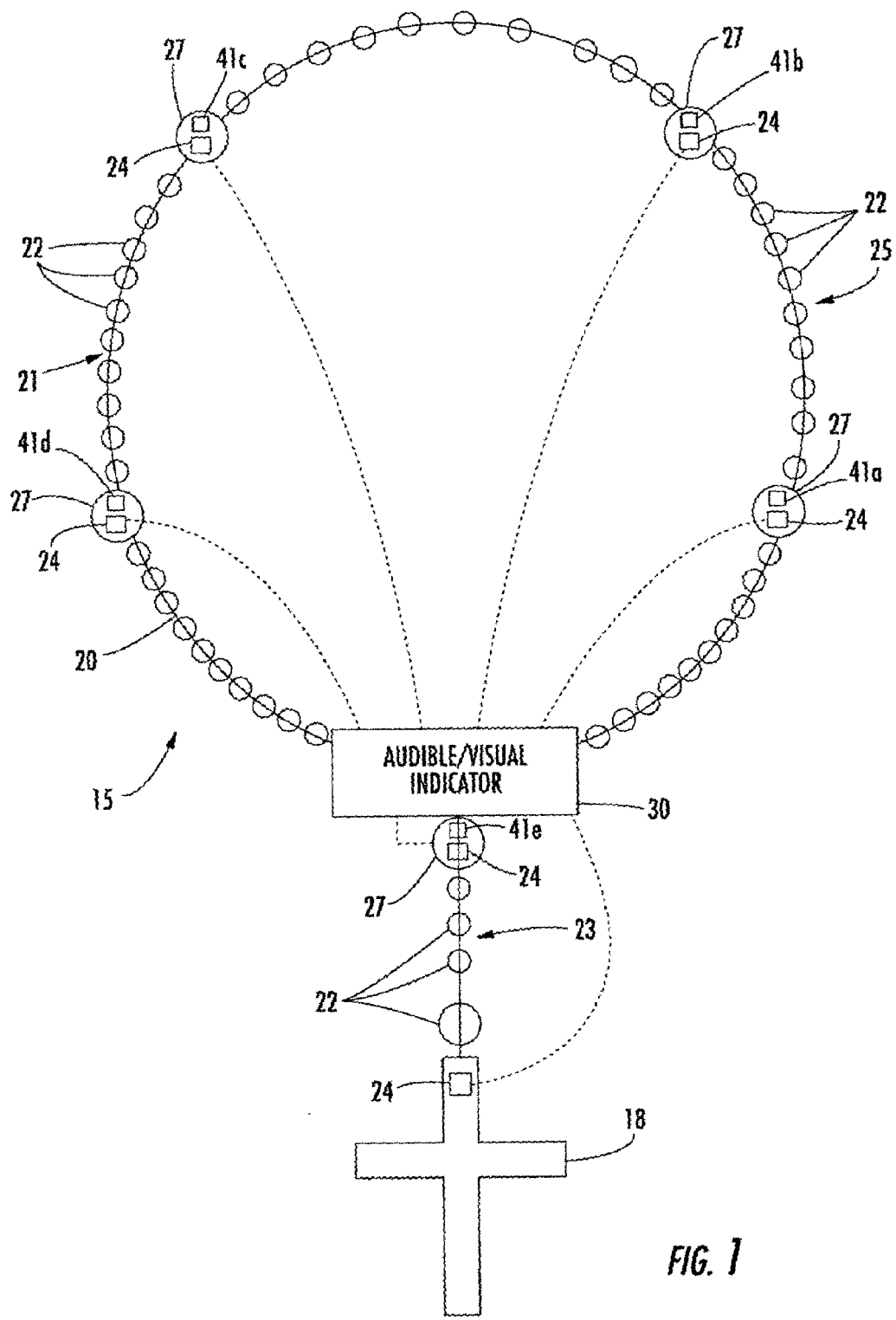
FIG. 1 is a schematic view of a rosary including an audible/visual indicator according to the present invention.
Figure 2:
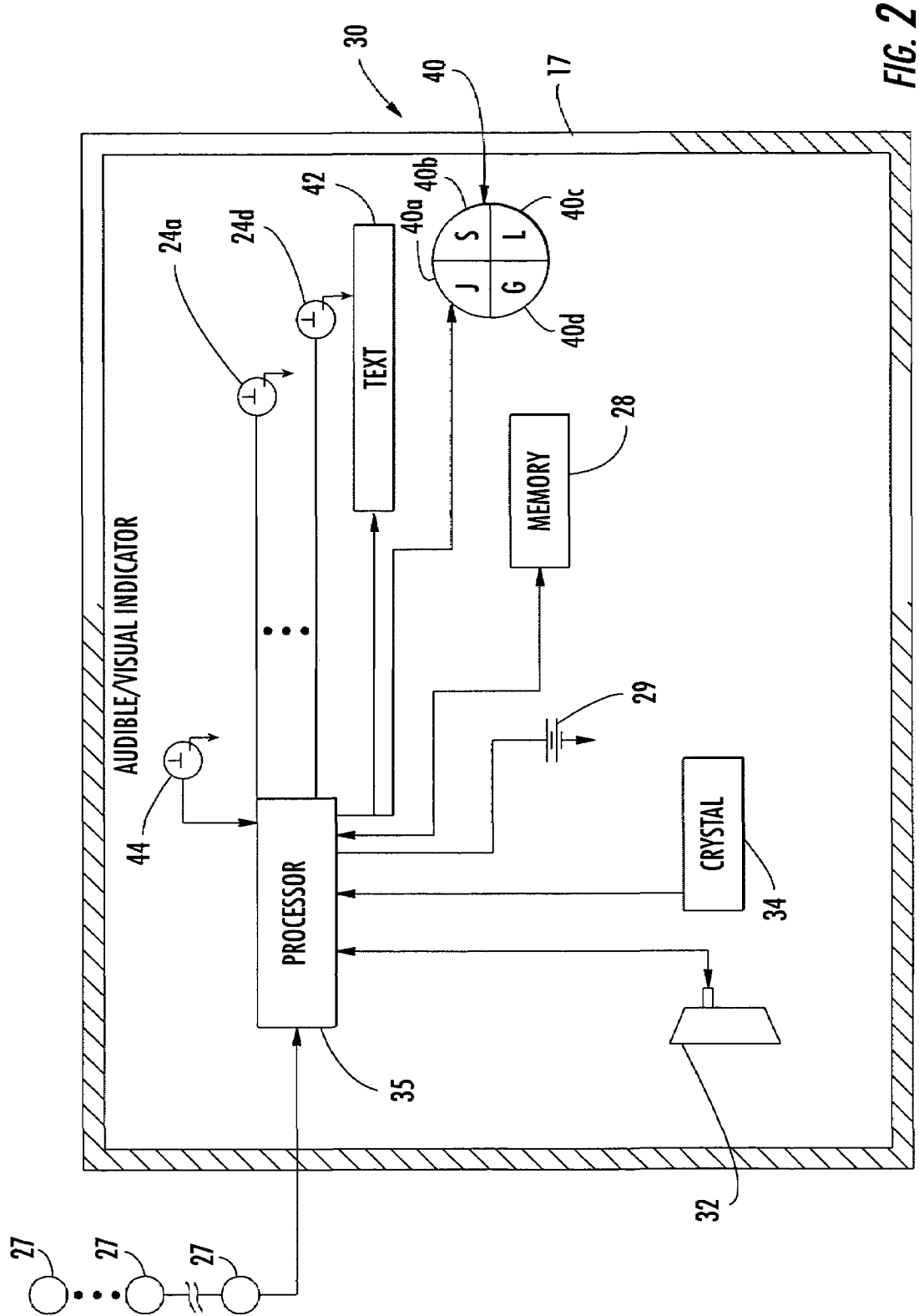
FIG. 2 is a more detailed schematic view of the audible/visual indicator shown in FIG. 1.

Referring initially to FIGS. 1–2, a rosary 15 according to the present invention is now described. The rosary 15 illustratively comprises a flexible elongate member 20 and a plurality of beads 22. The rosary 15 also illustratively includes a plurality of sensors 24, and an indicator 30 carried by the flexible elongate member 20 for providing an indication based upon the sensors.

Figure 5:
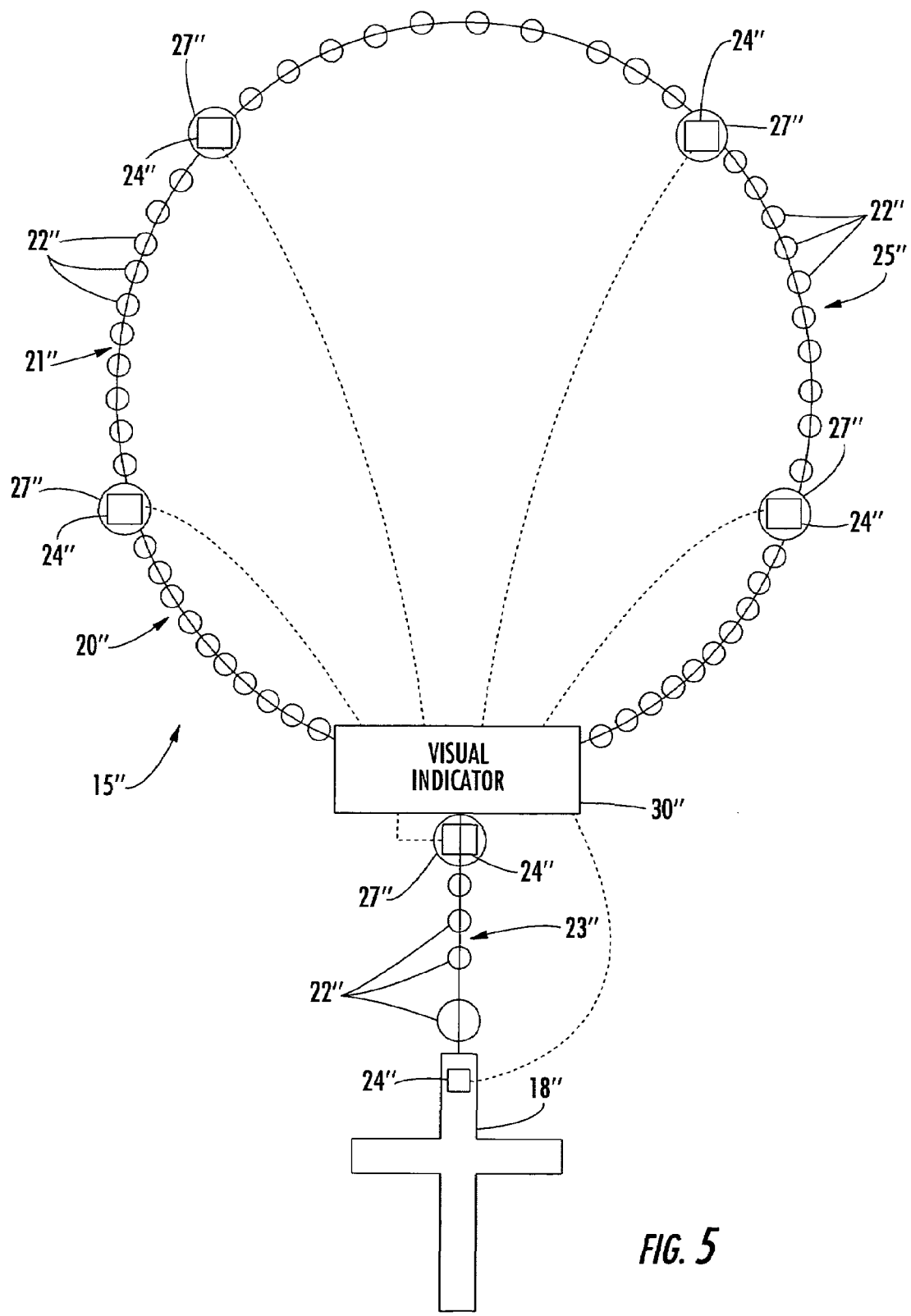
FIG. 5 is a schematic view of a rosary including a visual indicator according to the present invention.
Figure 6:
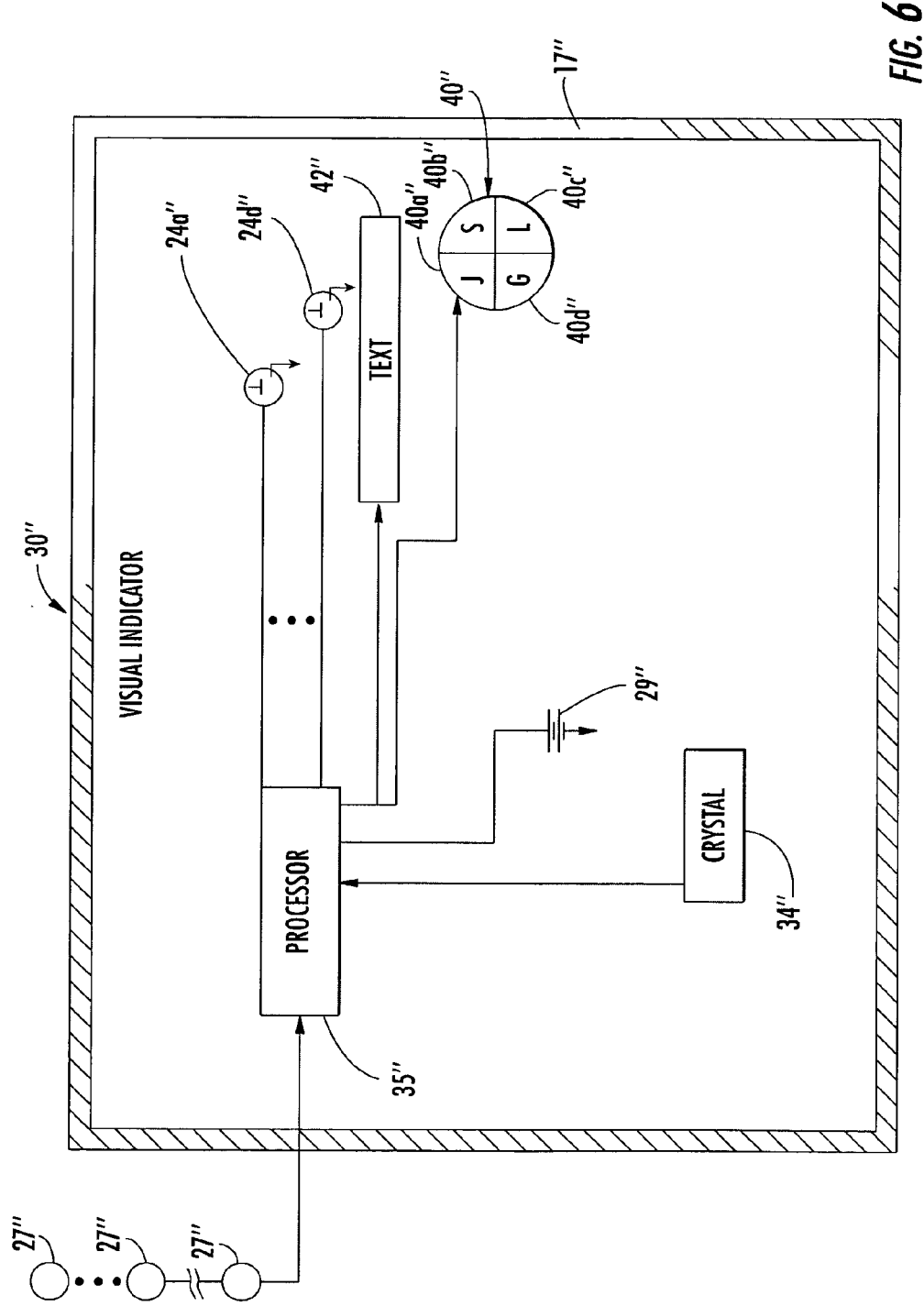
FIG. 6 is a more detailed schematic view of the visual indicator shown in FIG. 5.

The rosary 15 includes a housing 17, and an audible/visual indicator 30 carried by the housing. The audible/visual indicator 30 advantageously selectively provides both an audible and a visual indication based upon the sensors 24. As will be discussed in greater detail below, however, alternate embodiments of the rosary 15 may include an audible indicator 30' (FIGS. 3–4) or a visual indicator 30" (FIGS. 5–6).

The flexible elongate member 20 is illustratively arranged in a loop 21 and includes a leg 23 extending outwardly therefrom. A religious symbol 18, such as a cross, for example, may be connected to an end of the leg 23. The audible/visual indicator 30 is illustratively carried at a junction between the loop 21 and the leg 23. Those skilled in the art will appreciate that the audible/visual indicator 30 may also be carried along any other portion of the flexible elongate member 20, the leg 23, or on the religious symbol 18. More specifically, the housing 17 may be shaped as the religious symbol 18 so that the audible/visual indicator 30 is thereby carried by the religious symbol.

The plurality of beads 22 comprises sets of beads 25 separated by respective transition beads 27. Each set of beads 25 may, for example, comprise ten beads, or any other number of beads depending on the intended use, i.e., the desired prayers. Those skilled in the art will appreciate, however, that the beads 22 may have any other configuration. Each of the beads 22 may represent a particular prayer. Further, each set of beads 25 and respective transition beads 27 may represent a particular set of prayers. The leg 23, also known as the "small chain" may, for example, comprise three beads 22 and at least one transition bead 27 thereon. Again, those skilled in the art will appreciate, however, that the beads 22 on the leg 23 may also have any other configuration.

The sensors 24 are illustratively carried by the transition beads 27 and are connected to the audible/visual indicator 30. A sensor 24 may also illustratively be carried by the religious symbol 18. The connections between the sensors 24 and the audible/visual indicator 30 are schematically illustrated by the dashed lines. Those skilled in the art will appreciate that the connection between the sensors 24 and the audible/visual indicator 30 may be made with a wire, for example, adjacent the flexible elongate member 20 and the leg 23. The flexible elongate member 20 and/or the leg 23 may, in some cases, be the wires for making the connection between the sensors 24 and the audible/visual indicator 30.

The sensors 24 are connected to a processor 35 carried by the audible/visual indicator 30. A power supply, such as a battery 29, is also carried by the audible/visual indicator 30 and connected to the processor 35.

Additionally, or alternately, the sensors 24 may be carried by the audible/visual indicator 30 (FIG. 2). In such a case, the sensors 24 may be a plurality of momentary contact switches 24a, 24d that may be selectively activated by the user to either provide an audible indication or a visual indication. Those skilled in the art will appreciate that any number of switches 24a, 24d may be provided. Each of the plurality of switches 24a, 24d may correspond to a prayer associated with the rosary 15. Greater details regarding the operation of the rosary 15 are provided below.

The audible/visual indicator 30 may be a medallion, or emblem, having religious indicia thereon. The transition beads 27, may be smaller than the audible/visual indicator 30, and may also be a medallion, or emblem having a similar shape to the audible/visual indicator 30. Of course, in such a case, the transition beads 27 will have a size that is smaller than the size of the audible/visual indicator 30. Those skilled in the art will appreciate, however, that the transition beads 27 may have any size and shape.

The plurality of switches 24a, 24d are connected to the processor 35 so that the audible/visual indicator 30 is responsive to activation of the switches. The sensors 24 carried by the transition beads 27 and the religious symbol 18 are also illustratively connected to the processor 35.

The sensors 24 may sense user contact. More specifically, the sensors 24 may be pressure sensors, heat sensors, or other types of sensors for sensing user contact, as understood by those skilled in the art.

One of the sensors 24 may, additionally or alternately, sense a voice of the user. In other words, the voice of the user may activate the audible/visual indicator 30. The audible/visual indicator 30 may also include a recorder for recording the audible indication. Accordingly, the audible/visual indicator 30 may include a speaker/microphone 32 connected to the processor 35. The speaker/microphone 32 advantageously allows the user to activate the audible/visual indicator 30 based upon a user's voice, and also allows the user to customize, or personalize, the audible indication by recording a voice, such as the voice of a loved one, for example. The rosary 15 also comprises a memory 28 for storing an audible indication recorded by the user. The memory 28 is illustratively connected to the processor 35.

The audible/visual indicator 30 also includes a timer 34 for providing a different audible or visual indication based upon a calendar date. More particularly, the processor 35 implements a calendar function, such as using a crystal, as understood by those skilled in the art. Accordingly, the different audible or visual indications may relate to different calendar dates, such as Christmas or Easter, for example.

The audible indication may comprise a prayer, for example. The audible indication may also comprise an explanation of a set of prayers corresponding to a particular calendar date. The prayers may, for example, correspond to one of four Mysteries, such as the Joyful Mystery, the Sorrowful Mystery, the Glorious Mystery, and the Luminous Mystery. Each of the Mysteries may include corresponding prayer themes and prayers. Accordingly, the audible indication may be a recitation of the prayer theme or prayer corresponding to an appropriate Mystery, and may advantageously assist a user in reciting and learning the Mysteries, the prayer themes, and the associated prayers.

The visual indication may comprise a religious image, prayer text, or another image as understood by those skilled in the art. The religious image may be displayed on a visual display 40 connected to the processor 35. The illustrated display 40 is divided into four sections 40a–40d. Each of the sections illustrates one of the Mysteries described above. For example, a first one of the sections 40a is illustrated as an illuminating "J" to represent the Joyful Mystery. Similarly, a second one of the sections 40b is illustrated as an illuminating "S" to represent the Sorrowful Mystery; a third section 40c is illustrated as an illuminating "G" to represent the Glorious Mystery; and a fourth section 40d is illustrated as an illuminating "L" to represent the Luminous Mystery.

Those skilled in the art will appreciate that each of the transition beads 27 may also carry transition bead visual displays 41a–41e so that the transition beads may be illuminated. More specifically, each of the transition bead visual displays 41a–41e may permit the user to illuminate each of the transition beads 27, or provide an illuminated image on each of the transition beads, or any other type of illumination, as understood by those skilled in the art.

Those skilled in the art will also appreciate that the illuminated image on the display 40 may also be a religious image. For example, the Joyful Mystery may be an illuminated baby, representing the nativity. The Sorrowful Mystery may be an illuminated cross, representing the crucifixion. The Glorious Mystery may be an illuminated dove, representing the Holy Spirit, and the Luminous Mystery may be represented by an illuminated image of the Eucharist. The user may activate the visual indication by contacting one of the switches 24a, 24d, as noted above, via voice command, as also noted above, or by contacting one of the sensors 24 carried by the transition beads 27. Each of the transition beads 27 (also called decade beads) may represent one of the Mysteries.

The visual indication may also be text corresponding to a particular prayer. The text may be displayed on a text display 42 that is connected to the processor 35. The text may, for example, include the text of a prayer corresponding to one of the Mysteries, as described above, or the text corresponding to a prayer to be recited when the user is adjacent one of the plurality of beads 22. The text may also be an explanation of one of the Mysteries described above, if desired.

The audible/visual indicator 30 may also include a switch 44 for permitting user selection of at least one of the audible and visual indication. The switch 44 advantageously allows a user to customize use of the rosary 15 for different situations. For example, when the user is in a quiet environment, such as a church, it may be desirable to switch the audible/visual indicator 30 to a silent mode, i.e., only activate the visual indication in response to the sensors 24.

Figure 3:
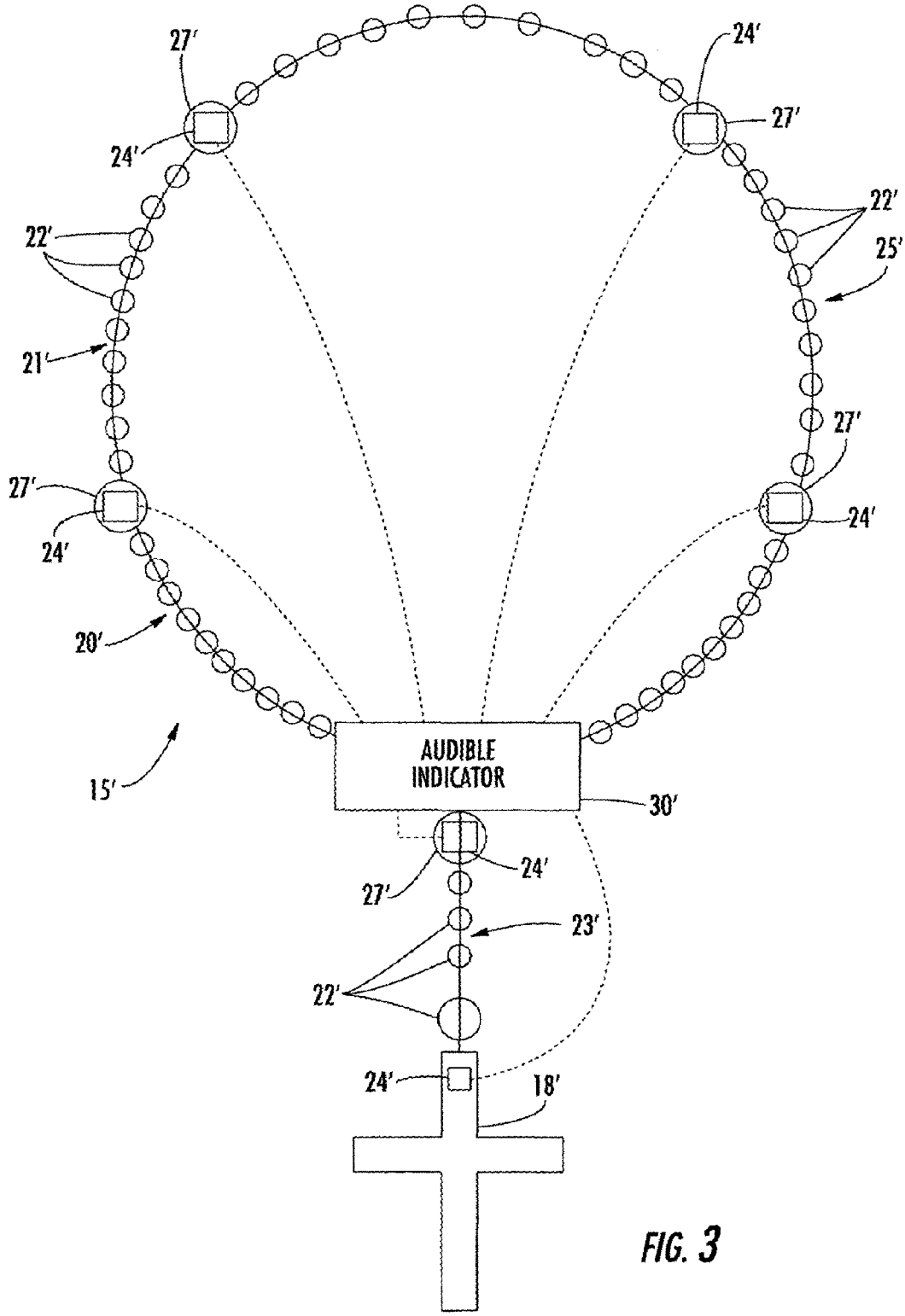
FIG. 3 is a schematic view of a rosary including an audible indicator according to the present invention.
Figure 4:
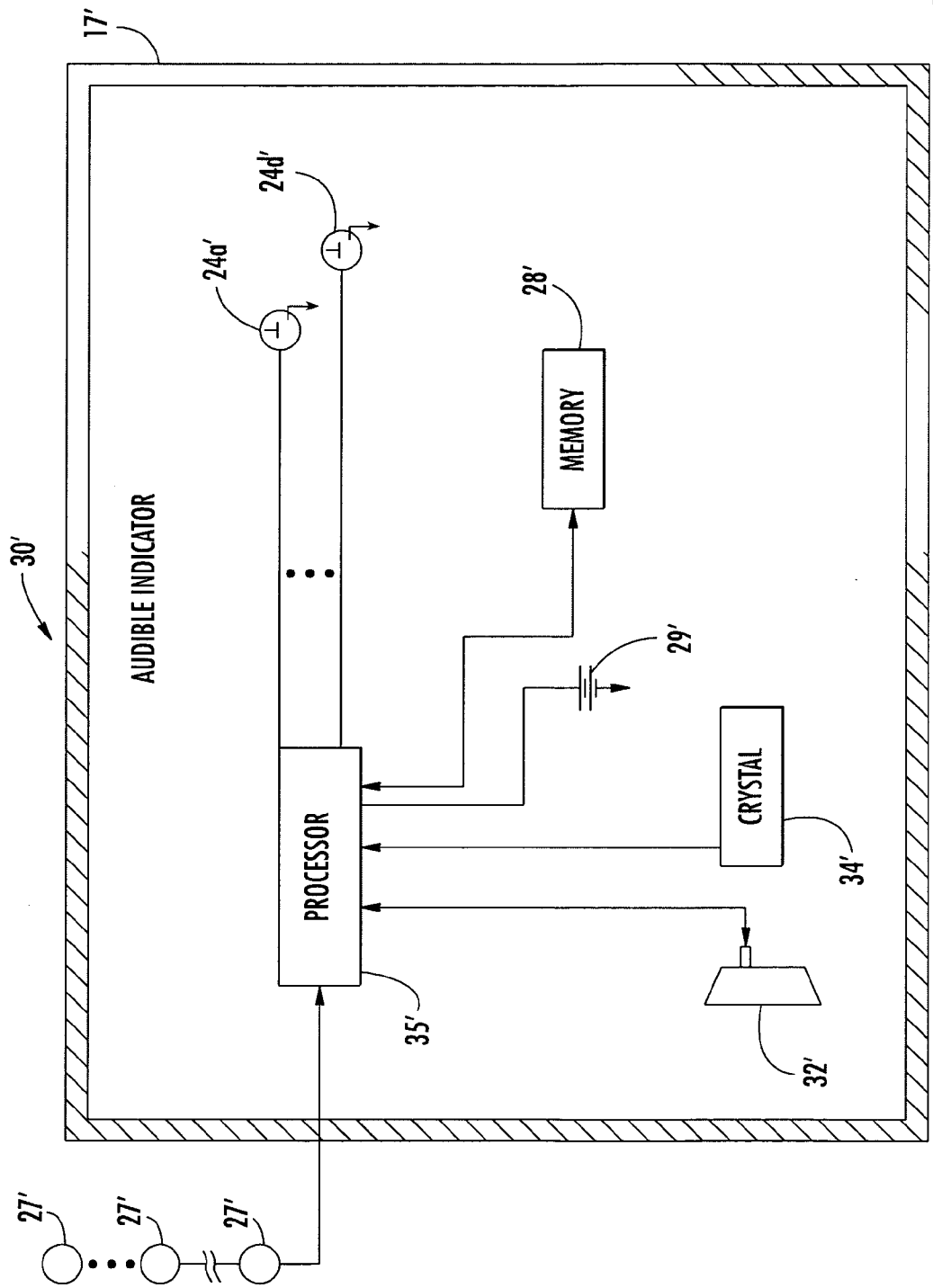
FIG. 4 is a more detailed schematic view of the audible indicator shown in FIG. 3.

Referring now additionally to FIGS. 3–4, another embodiment of the rosary 15', is now described. In the second embodiment of the rosary 15', only an audible indicator 30' is carried by the flexible elongate member 20' for providing an audible indication based upon the sensors 24'. The other aspects of the second embodiment of the rosary 15' are similar to those of the first embodiment, are labeled with prime notation, and require no further discussion herein.

Referring now additionally to FIGS. 5–6, still another embodiment of the rosary 15" is now described. In the third embodiment of the rosary 15", only a visual indicator 30" is carried by the flexible elongate member 20" for providing a visual indication based upon the sensors 24". The other aspects of the third embodiment of the rosary 15", are similar to those of the first embodiment, are labeled with double prime notation, and require no further discussion herein.

A method aspect of the present invention is for providing an audible indication relating to a rosary 15, 15'. As discussed above, the rosary 15, 15' comprises a flexible elongate member 20, 20', a plurality of beads 22, 22' carried thereby, a plurality of sensors 24, 24', and an audible indicator 30, 30' connected to the at least one sensor. The method comprises generating the audible indication from the audible indicator 30, 30' based upon the plurality of sensors 24, 24'.

Another method aspect of the present invention is for providing a visual indication relating to a rosary 15, 15". As also discussed above, the rosary 15, 15", comprises a flexible elongate member 20, 20" and a plurality of beads 22, 22" carried thereby, a plurality of sensors 24, 24", and a visual indicator 30, 30" connected to the plurality of sensors. The method comprises generating the visual indication from the visual indicator 30, 30", based upon the plurality of sensors 24, 24".

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A rosary comprising:
    a flexible elongate member and a plurality of beads carried thereby, said plurality of beads comprising sets of beads separated by respective transition beads;
    at least one sensor carried by at least one of said transition beads; and
    an audible indicator carried by said flexible elongate member for providing an audible indication based upon said at least one sensor.

2. A rosary according to claim 1 wherein said flexible elongate member is arranged in a loop and with a leg extending outwardly therefrom; and wherein said audible indicator is carried at a junction between the loop and leg.

3. A rosary according to claim 1 wherein said at least one sensor senses user contact.

4. A rosary according to claim 1 wherein said at least one sensor senses a voice of a user.

5. A rosary according to claim 1 wherein said audible indicator comprises a recorder for recording the audible indication.

6. A rosary according to claim 1 wherein said audible indicator comprises a timer for providing a different audible indication based upon a calendar date.

7. A rosary according to claim 1 wherein the audible indication comprises at least one prayer.

8. A rosary according to claim 1 further comprising a visual indicator for providing a visual indication based upon said at least one sensor.

9. A rosary according to claim 8 wherein said visual indicator comprises a timer for providing a different visual indication based upon a calendar date.

10. A rosary according to claim 8 wherein the visual indication comprises at least one religious image.

11. A rosary according to claim 8 wherein the visual indication comprises prayer text.

12. A rosary according to claim 8 further comprising a switch for permitting user selection of at least one of the audible and visual indication.

13. A rosary according to claim 8 further comprising a housing mounting at least one of said audible indicator and said visual indicator.

14. A rosary comprising:
    a flexible elongate member and a plurality of beads carried thereby, said flexible elongate member being arranged in a loop and with a leg extending outwardly therefrom, said plurality of beads comprising sets of beads separated by respective transition beads;

at least one sensor carried by at least one of said transition beads; and a visual indicator carried by said flexible elongate member at a junction between the loop and the leg for providing a visual indication based upon said at least one sensor.

15. A rosary according to claim 14 wherein said at least one sensor senses user contact.

16. A rosary according to claim 14 wherein said at least one sensor senses a voice of a user.

17. A rosary according to claim 14 wherein said visual indicator comprises a timer for providing a different visual indication based upon a calendar date.

18. A rosary according to claim 14 wherein the visual indication comprises at least one religious image.

19. A rosary according to claim 14 wherein the visual indication comprises prayer text.

20. A rosary according to claim 14 further comprising a housing mounting said visual indicator.

21. A method to assist a user in reciting and learning prayers associated with a rosary, the method comprising:

providing a rosary including a flexible elongate member, a plurality of beads carried thereby and comprising sets of beads separated by respective transition beads, at least one sensor carried by at least one of the transition beads, and an audible indicator connected to the at least one sensor; and generating an audible indication from the audible indicator based upon the at least one sensor to thereby assist the user in reciting and learning prayers associated with the rosary.

22. A method according to claim 21 wherein the flexible elongate member is arranged in a loop and with a leg extending outwardly therefrom; and wherein the audible indicator is carried at a junction between the loop and leg.

23. A method according to claim 21 further comprising sensing user contact.

24. A method according to claim 21 further comprising sensing a voice of a user.

25. A method according to claim 21 further comprising recording the audible indication.

26. A method according to claim 21 further comprising providing a different audible indication based upon a calendar date.

27. A method to assist a user in reciting and learning prayers associated with a rosary, the method comprising:

providing a rosary comprising a flexible elongate member and a plurality of beads carried thereby comprising sets of beads separated by respective transition beads, the flexible member being arranged in a loop and with a leg extending outwardly therefrom, the rosary further comprising at least one sensor carried by at least one of the transition beads, and a visual indicator connected to the at least one sensor and carried at a junction between the loop and the leg; and generating the visual indication from the visual indicator based upon the at least one sensor to thereby assist the user in reciting and learning prayers associated with the rosary.

28. A method according to claim 27 further comprising sensing user contact.

29. A method according to claim 27 further comprising sensing a voice of a user.

30. A method according to claim 27 further comprising providing a different visual indication based upon a calendar date.

31. A rosary comprising:

a flexible elongate member and a plurality of beads carried thereby;

at least one sensor; and an audible indicator carried by said flexible elongate member for providing an audible indication based upon said at least one sensor;

said audible indicator comprising a timer for providing a different audible indication based upon a calendar date.

32. A rosary according to claim 31 wherein said flexible elongate member is arranged in a loop and with a leg extending outwardly therefrom; and wherein said audible indicator is carried at a junction between the loop and leg.

33. A rosary according to claim 31 wherein said at least one sensor is carried by said audible indicator.

34. A rosary according to claim 31 wherein said audible indicator comprises a recorder for recording the audible indication.

35. A rosary according to claim 31 wherein the audible indication comprises at least one prayer.

36. A rosary comprising:

a flexible elongate member and a plurality of beads carried thereby, said flexible elongate member being arranged in a loop and with a leg extending outwardly therefrom;

at least one sensor; and a visual indicator carried by said flexible elongate member at a junction between the loop and the leg for providing a visual indication based upon said at least one sensor;

said visual indicator comprises a timer for providing a different visual indication based upon a calendar date.

37. A rosary according to claim 36 wherein the visual indication comprises prayer text.

38. A rosary according to claim 36 further comprising a housing mounting said visual indicator.

39. A rosary according to claim 36 wherein said at least one sensor is carried by said visual indicator.

* * * * *